US011794301B2

(12) United States Patent
Nagaosa

(10) Patent No.: US 11,794,301 B2
(45) Date of Patent: Oct. 24, 2023

(54) CHUCK GRIP ACCURACY CHECKING METHOD, CHUCK CLAW EXCHANGING METHOD, AND CHUCK GRIP ACCURACY CHECKING DEVICE

(71) Applicant: HOWA MACHINERY, LTD., Kiyosu (JP)

(72) Inventor: Hiroshi Nagaosa, Kiyosu (JP)

(73) Assignee: HOWA MACHINERY, LTD., Kiyosu (JP)

( * ) Notice: Subject to any disclaimer, the term of this patent is extended or adjusted under 35 U.S.C. 154(b) by 249 days.

(21) Appl. No.: 17/266,332

(22) PCT Filed: Aug. 9, 2019

(86) PCT No.: PCT/JP2019/031573

§ 371 (c)(1),
(2) Date: Feb. 5, 2021

(87) PCT Pub. No.: WO2020/032237

PCT Pub. Date: Feb. 13, 2020

(65) Prior Publication Data

US 2021/0308817 A1 Oct. 7, 2021

(30) Foreign Application Priority Data

Aug. 10, 2018 (JP) ................................ 2018-150931

(51) Int. Cl.
*B23Q 17/22* (2006.01)
*B23B 31/02* (2006.01)
(Continued)

(52) U.S. Cl.
CPC .......... *B23Q 17/2291* (2013.01); *B23B 31/02* (2013.01); *B23Q 3/06* (2013.01); *G01L 5/0028* (2013.01); *G01L 5/16* (2013.01)

(58) Field of Classification Search
CPC ................. B23Q 17/2291; B23Q 3/06; B23Q 2017/001; B23B 31/02; B23B 31/16; G01L 5/0028; G01L 5/16
(Continued)

(56) References Cited

U.S. PATENT DOCUMENTS

2021/0008644 A1* 1/2021 Nagaosa ................ B23B 31/39
2021/0379676 A1* 12/2021 Nagaosa ................ B23B 31/39
2022/0184712 A1* 6/2022 Nagaosa ........... B23B 31/16254

FOREIGN PATENT DOCUMENTS

CN 206732378 * 12/2017
JP S58-094901 A 6/1983
(Continued)

OTHER PUBLICATIONS

Sep. 24, 2019 International Search Report issued in International Patent Application No. PCT/JP2019/031573.

*Primary Examiner* — Octavia Davis Hollington
(74) *Attorney, Agent, or Firm* — Oliff PLC

(57) ABSTRACT

A chuck grip accuracy checking method includes a gripping in which the measurement target is gripped on the claws, a moving step, and a measuring step. In the moving step, a movable member provided with a measurement instrument capable of measuring a run-out of the measurement target is moved by driving a movable-member driver to a position at which the measurement instrument can measure a run-out of the measurement target. In the measuring step, a run-out of the measurement target is measured by the measurement instrument, while the chuck is being rotated by driving a rotation driver.

10 Claims, 6 Drawing Sheets

26,32,34 23 2 21 29 27,28,30 33 24 3 5 22 1 6 6b 25 17 17 4 17b 6a 4 3a 3a Z 17a 17b 17a MP(W) MPa 17a MPb 3a Y 17 4

(51) Int. Cl.

| | |
|---|---|
| ***B23Q 3/06*** | (2006.01) |
| ***G01L 5/00*** | (2006.01) |
| ***G01L 5/16*** | (2020.01) |

(58) Field of Classification Search

USPC .................................................... 73/862.041

See application file for complete search history.

(56) References Cited

FOREIGN PATENT DOCUMENTS

| | | | | |
|---|---|---|---|---|
| JP | S59-102591 | A | | 6/1984 |
| JP | S63-034051 | A | | 2/1988 |
| JP | S63-272408 | A | | 11/1988 |
| JP | H02-109616 | A | | 4/1990 |
| JP | H05-200649 | A | | 8/1993 |
| JP | H08-155773 | A | | 6/1996 |
| JP | H0947908 | | * | 2/1997 |
| JP | 2000357322 | | * | 12/2000 |
| JP | 3185816 | B2 | | 7/2001 |
| JP | 2001515415 | | * | 9/2001 |
| JP | 2011056596 | | * | 3/2011 |

* cited by examiner

CHUCK GRIP ACCURACY CHECKING METHOD, CHUCK CLAW EXCHANGING METHOD, AND CHUCK GRIP ACCURACY CHECKING DEVICE

TECHNICAL FIELD

The present invention relates to a chuck grip accuracy checking method, a chuck claw exchanging method, and a chuck grip accuracy checking device.

BACKGROUND ART

Claws attached to a chuck body of a chuck are conventionally exchanged for others, when a size of a workpiece to be machined changes, or when a claw is worn out because of long-term use. After the claws have been exchanged, grip accuracy of the chuck is checked. When claws are exchanged by an automatic claw exchanging device as in Patent Document 1, an operator checks grip accuracy of a chuck as follows. After the claws have been exchanged, a master workpiece is griped on the chuck. Then, while the chuck is being rotated, a run-out of the master workpiece is measured by a measurement instrument, and the operator reads a measured value thereof. Alternatively, an operator may check the chuck grip accuracy by measuring a run-out of a workpiece machined by means of the exchanged claws.

Patent Document 1: Patent Gazette of JP3185816

DISCLOSURE OF THE INVENTION

However, when an operator measures a run-out of a master workpiece or a workpiece, there is a problem in reliability, because he/she may misread a measured value and/or measurements may vary, for example.

Therefore, in view of the above problem, the object of the present invention is to provide a chuck grip accuracy checking method, a chuck claw exchanging method, and a chuck grip accuracy checking device, which are capable of improving the reliability.

The present invention provides:

- a chuck grip accuracy checking method for checking grip accuracy by gripping a measurement target on claws of a chuck, the chuck grip accuracy checking method comprising:
- a gripping step in which the measurement target is gripped on the claws;
- a moving step in which a movable member provided with a measurement instrument capable of measuring a run-out of the measurement target is moved by driving a movable-member driver to a position at which the measurement instrument can measure a run-out of the measurement target; and
- a measuring step in which a run-out of the measurement target is measured by the measurement instrument, while the chuck is being rotated by driving a rotation driver.

In the aforementioned chuck grip accuracy checking method, the movable-member driver may include an elevation driver that vertically moves the movable member, an axial movement driver that moves the movable member in an axial direction of the chuck, and a lateral movement driver that moves the movable member in a lateral direction when seen in the axial direction.

In the aforementioned chuck grip accuracy checking method, the measuring step may include a first measuring step in which a run-out of a cylindrical outer circumferential surface of the measurement target is measured, and a second measuring step in which a run-out of a distal end surface of the measurement target is measured.

In the aforementioned chuck grip accuracy checking method, the measurement instrument may include a first measurement instrument capable of measuring a vertical displacement, and a second measurement instrument capable of measuring a horizontal displacement.

In the aforementioned chuck grip accuracy checking method,

- in the measuring step, the movable member may be moved by driving the movable-member driver to a position at which the first measurement instrument can measure a run-out of the measurement target;
- in the first measuring step, a run-out of the cylindrical outer circumferential surface of the measurement target may be measured by the first measurement instrument;
- after the first measuring step, the movable member may be moved by driving the movable-member driver to a position at which the second measurement instrument can measure a run-out of the measurement target; and
- in the second measuring step, a run-out of the distal end surface of the measurement target may be measured by the second measurement instrument.

In the aforementioned chuck grip accuracy checking method, in the gripping step, the measurement target may be conveyed by the movable member to the chuck.

In addition, the present invention provides:

- a chuck claw exchanging method comprising:
- an exchanging step in which claws of a chuck are exchanged; and
- a grip accuracy checking step in which grip accuracy of the chuck after the exchanging step is checked by the aforementioned chuck grip accuracy checking method.

In addition, the present invention provides:

- a chuck grip accuracy checking device for checking grip accuracy by gripping a measurement target on claws of a chuck, the chuck grip accuracy checking device comprising:
- a rotation driver that rotates the chuck;
- a movable member that is provided movably with respect to the chuck;
- a movable-member driver that moves the movable member with respect to the measurement target;
- a measurement instrument that is provided on the movable member, and measures a run-out of the measurement target; and
- a controller;
- wherein the controller controls the rotation driver, the movable-member driver and the measurement instrument such that, after the movable member has been moved to a position at which the measurement instrument can measure a run-out of the measurement target, a run-out of the measurement target is measured by the measurement instrument, while the chuck is being rotated.

In the aforementioned chuck grip accuracy checking device, the movable-member driver may include an elevation driver that vertically moves the movable member, an axial movement driver that moves the movable member in an axial direction of the chuck, and a lateral movement driver that moves the movable member in a lateral direction when seen in the axial direction.

In the aforementioned chuck grip accuracy checking device, the measurement instrument may include a first measurement instrument capable of measuring a vertical displacement, and a second measurement instrument capable of measuring a horizontal displacement.

In the aforementioned chuck grip accuracy checking device, the controller may control the movable-member driver and the measurement instrument such that: the movable member is moved to a position at which the first measurement instrument can measure a run-out of a cylindrical outer circumferential surface of the measurement target; that a run-out of the cylindrical outer circumferential surface of the measurement target is measured by the first measurement instrument; that the movable member is moved to a position at which the second measurement instrument can measure a run-out of a distal end surface of the measurement target; and that a run-out of the distal end surface of the measurement target is measured by the second measurement instrument.

In the aforementioned chuck grip accuracy checking device, the movable member may be capable of conveying the measurement target to the chuck.

The present invention can improve the reliability.

DESCRIPTION OF EMBODIMENTS

Figure 1:
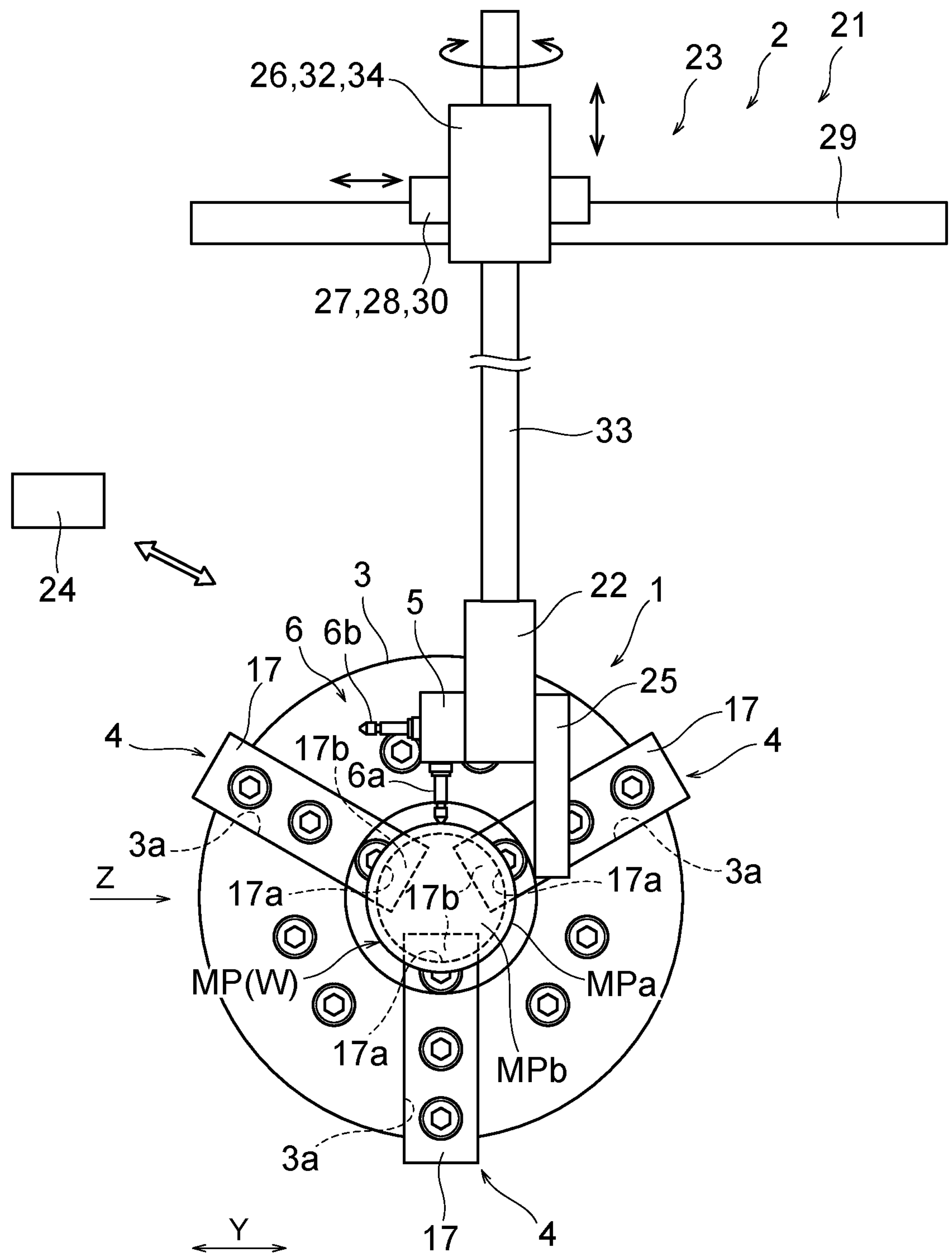
FIG. 1 is a view showing a chuck grip accuracy checking device according to an embodiment and a chuck which are seen in an axial direction, the view showing a state in which a run-out of a cylindrical outer circumferential surface of a master workpiece gripped on the chuck is being measured.

Herebelow, an embodiment of the present invention is described based on the drawings. In this embodiment, a chuck to be described is a chuck of a machine tool such as an NC lathe by way of example. In the drawings attached to the specification, a scale size, an aspect ratio and so on are changed and exaggerated from the actual ones, for the convenience of easiness in illustration and understanding.

The chuck of the machine tool is schematically described first.

Figure 2:
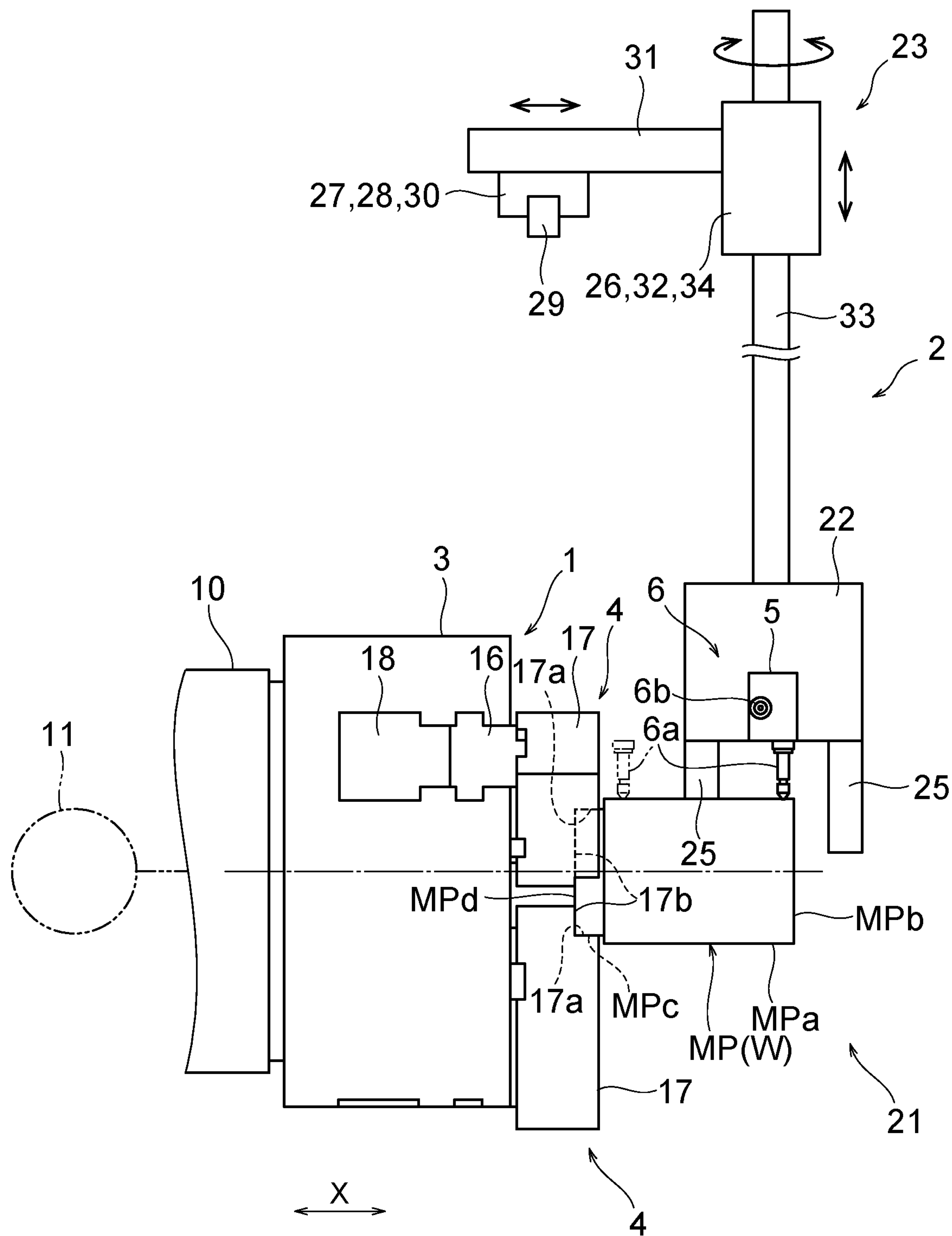
FIG. 2 is a view taken along an arrow Z of FIG. 1.
Figure 3:
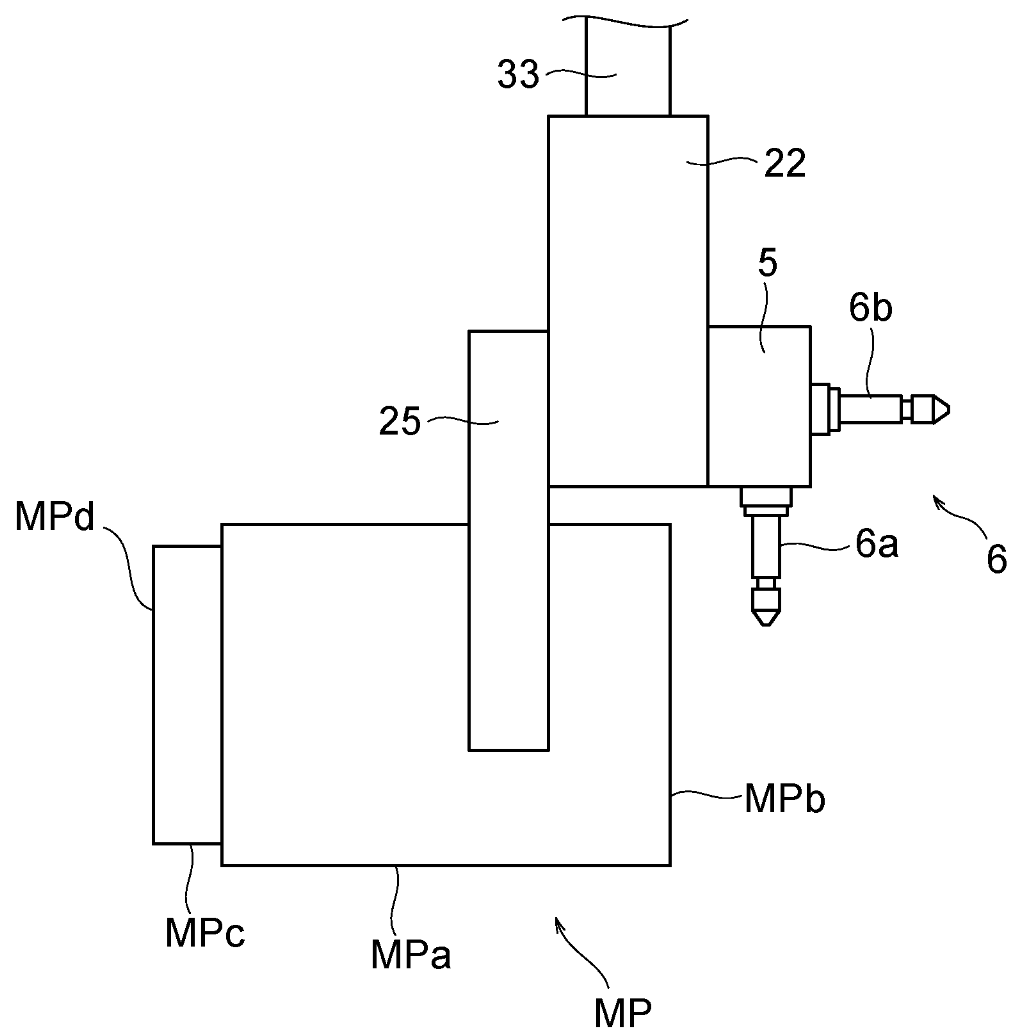
FIG. 3 is a view showing a state in which a loader of FIG. 2 conveys a master workpiece.

As shown in FIGS. 1 and 2, the chuck 1 comprises a chuck body 3 secured on a spindle 10 of the machine tool, and claws 4 that clamp (grip) a workpiece W to be machined or a master workpiece MP. The chuck 1 according to this embodiment comprises three claws 4. As shown in FIG. 3, a workpiece W to be machined and a master workpiece MP are conveyed to the chuck 1 by a loader 2 shown as an example of a conveyor.

The workpiece W to be machined, which is clamped on the chuck 1, is machined by a tool post (not shown) with a plurality of cutting tools. As shown in FIG. 2, the chuck 1 is rotatable by a rotation driver 11 through the spindle 10. During machining, the rotation driver 11 is driven to rotate the chuck 1 together with the spindle 10, so that the workpiece W is machined while being rotated. Depending on the type of machining, the workpiece W may be machined in a stopped state, i.e., without being rotated. The tool post is movable in an axial direction X of the chuck 1, in a lateral direction Y (or a horizontal direction) when seen in the axial direction X, and also in a vertical direction.

Figure 4:
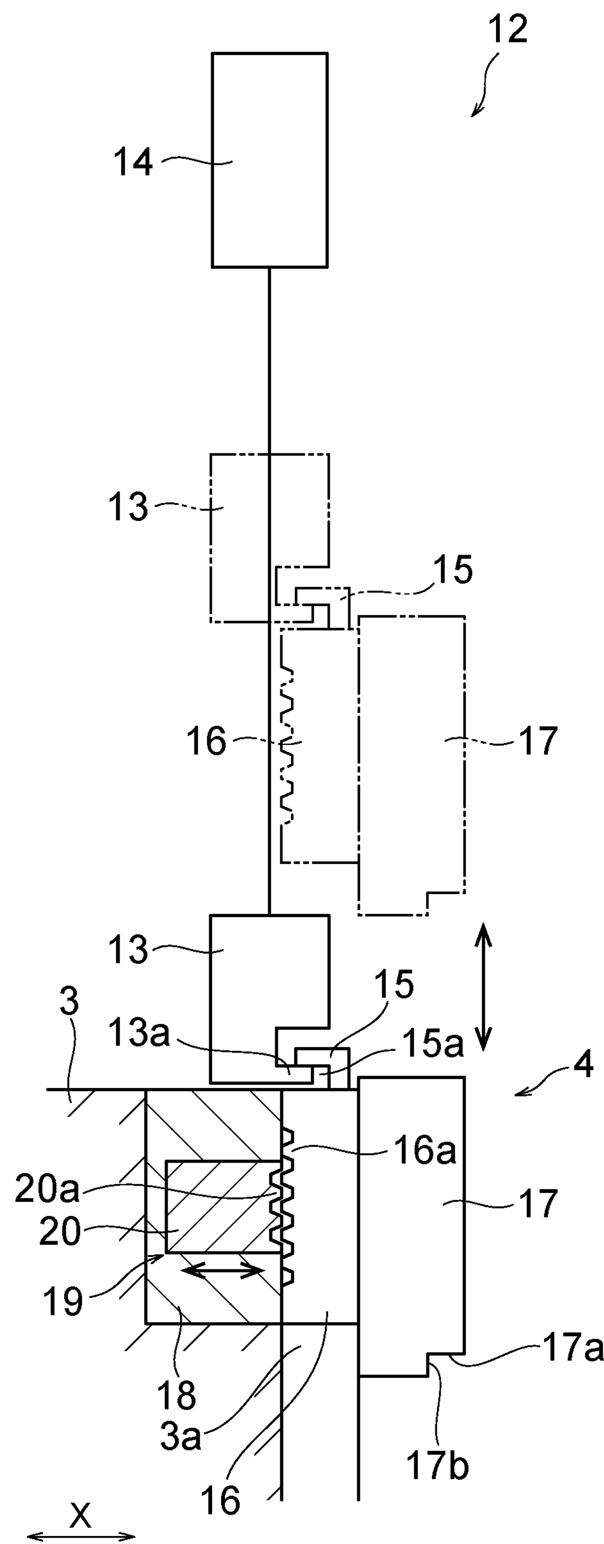
FIG. 4 is a schematic view showing an automatic claw exchanging device of FIG. 2.

As shown in FIG. 4, an automatic claw exchanging device 12 as described in Patent Gazette of JP3185816, for example, is installed above the chuck 1. The claws 4 attached to the chuck body 3 can be automatically exchanged by the automatic claw exchanging device 12. For example, the claws 4 are exchanged for other ones, when a size of a workpiece W to be machined changes, and/or when the claw 4 is worn out because of long-term use. The claws 4 are formed to correspond to a size of a workpiece W to be machined (more specifically, an external diameter of a proximal end portion of the workpiece W) such that they can grip the workpiece W. For this end, plural types of claws 4 are stocked in a stocker (not shown) of the automatic claw exchanging device 12.

As shown in FIG. 4, the automatic claw exchanging device 12 includes an elevatable (vertically movable) finger 13, and a claw elevation driver 14 that vertically moves the finger 13. The finger 13 has a key piece **13*a* capable of latching onto a hook groove 15*a* of an attachment block 15 provided on an upper part of the claw 4. By latching the key piece 13*a* of the finger 13 onto the hook groove 15*a* of the attachment block 15, and by driving the claw elevation driver 14, the claw 4 is vertically moved. The finger 13 is also movable in the axial direction X of the chuck 1**.

As shown in FIGS. 2 and 4, the claw 4 includes a base jaw 16 fitted in an attachment groove **3*a* provided in the chuck body 3, and a top jaw 17 that is attached to the base jaw 16 to project from an end surface (a right end surface in FIG. 2) of the chuck body 3. The attachment groove 3*a* radially extends and opens to an outer circumferential surface of the chuck body 3. As shown in FIGS. 1 and 4, the attachment groove 3*a* also opens to the end surface of the chuck body 3. By inserting the base jaw 16 to which the top jaw 17 is attached into the attachment groove 3*a* radially from outside (from above) and by moving the base jaw 16 radially inside, the claw 4 can be attached to the chuck 1. At this time, the claw 4 is moved radially inside, up to a position at which the driving of the claw elevation driver 14 is stopped. In order to detach the claw 4, the claw 4 is moved radially outside and is pulled out from the attachment groove 3*a***.

Three master jaws 18 are provided inside the chuck body 3 correspondingly to the three claws 4. The three master jaws 18 are radially movable in a synchronous manner by a claw driver, not shown. As shown in FIG. 4, a claw releasably-engagement device 19 is provided in the master jaw 18, whereby the base jaw 16 is releasably engageable with the master jaw 18. Namely, the claw releasably-engagement device 19 includes a meshing member 20 whose distal end surface (a surface facing the base jaw 16) has rack teeth **20*a*. The rack teeth 20*a* can mesh with rack teeth 16*a* provided on a rear end surface (a surface facing the master jaw 18) of the base jaw 16. The meshing member 20 is movable in the axial direction X. Thus, when the meshing member 20 is moved forward to the base jaw 16, the rack teeth 20*a* of the meshing member 20 mesh with the rack teeth 16*a* of the base jaw 16. Thus, the base jaw 16, the top jaw 17 and the master jaw 18 are integrally movable in the radial direction. On the other hand, when the meshing member 20 is moved backward from the base jaw 16, the meshing between the rack teeth 20*a* of the meshing member 20 and the rack teeth 16*a* of the base jaw 16 is released. Thus, the base jaw 16 and the top jaw 17 become radially movable separately from the master jaw 18, whereby the claw 4** can be exchanged.

In order to grip a master workpiece MP, each top jaw 17 is radially moved inside together with the base jaw 16 and the master jaw 18, so that an inner circumferential contact surface 17*a* provided on an inside end portion of each top jaw 17 comes into contact with a proximal end outer circumferential contact surface MPc (described later) of the master workpiece MP (chuck 1 closes). Since the inner circumferential contact surface 17*a* of the respective top jaws 17, which are in contact with the proximal end outer circumferential contact surface MPc of the master workpiece MP, press the proximal end outer circumferential contact surface MPc, the master workpiece MP is gripped on the claws 4.

On the other hand, in order to detach the master workpiece MP, each top jaw 17 is radially moved outside together with the base jaw 16 and the master jaw 18, so that the inner circumferential contact surface 17*a* of each top jaw 17 is moved away from the master workpiece MP (chuck 1 opens). Thus, the master workpiece MP is detached from the claws 4.

In the case of exchanging such claws 4, grip accuracy of the chuck 1 by the exchanged claws 4 is checked, in order to maintain machining accuracy of a workpiece W. Namely, as described above, when the base jaw 16 of the claw 4 is engaged with the master jaw 18 by the claw releasably-engagement device 19, the base jaw 16 becomes movable integrally with the master jaw 18 in the radial direction, and also becomes movable synchronously with the base jaws 16 of the other claws 4. However, when the claws 4 are mounted on the chuck body 3 with radial positions of the base jaws 16 of the respective claws 4 being different from one another, it is difficult for the respective top jaws 17 to uniformly come into contact with the proximal end outer circumferential contact surface MPc of the master workpiece MP. Namely, the master workpiece MP is disproportionately gripped on the chuck 1. When a workpiece W is gripped on such a chuck 1 and is rotated, a run-out of the workpiece W increases, which may result in deterioration of machining accuracy of the workpiece W. A device for checking grip accuracy of the chuck 1 (referred to simply as grip accuracy checking device 21 herebelow) is a device for dealing with such a problem, the device checking grip accuracy grip accuracy by gripping a measurement target (referred to as master workpiece MP by way of example herebelow) on the claws 4 of the chuck 1 as described above.

As shown in FIGS. 1 and 2, grip accuracy checking device 21 according to this embodiment comprises the rotation driver 11 that rotates the chuck 1, a hand 22 (movable member) that is provided movably with respect to the chuck 1, a loader driver 23 (movable-member driver), a measurement instrument 6, and a controller 24.

As shown in FIGS. 2 and 3, the master workpiece MP has a cylindrical outer circumferential surface MPa, a distal end surface MPb, the proximal end outer circumferential contact surface MPc, and a proximal end surface MPd. In a state where the master workpiece MP is gripped on the chuck 1, the cylindrical outer circumferential surface MPa is along the axial direction X, while the distal end surface MPb and the proximal end surface MPd are perpendicularly to the axial direction X. The distal end surface MPb is positioned oppositely to the chuck 1, and the proximal end surface MPd is closer to the chuck 1. The proximal end outer circumferential contact surface MPc, which is closer to the proximal end surface MPd, is a portion to be gripped on the claws 4. Plural kinds of master workpieces MP are stocked in the stocker (not shown) correspondingly to workpieces W. Namely, plural kinds of master workpieces MP having proximal end outer circumferential contact surfaces MPc with different external diameters are stocked in the stocker.

As shown in FIGS. 1 and 2, the loader 2 has the hand 22 (movable member) which is provided movably with respect to the master workpiece MP and the chuck 1. As described above, the loader 2 is a device for conveying the master workpiece MP to the chuck 1. The hand 22 can convey the master workpiece MP to the chuck 1. More specifically, as shown in FIG. 3, the hand 22 of the loader 2 is provided with a pair of hand claws 25 that clamp the master workpiece MP. The master workpiece MP is clamped between the pair of hand claws 25. Each hand claw 25 is attached to one side surface of the cuboid hand 22. The loader 2 conveys the master workpiece MP to a position at which the master workpiece MP can be clamped on the claws 4 of the chuck 1, and conveys the master workpiece MP from the chuck 1 to the aforementioned stocker. The loader 2 can also convey a workpiece W similarly to the master workpiece MP.

The hand 22 of the loader 2 is moved by the loader driver 23 (movable-member driver) with respect to the chuck 1. The loader driver 23 includes a loader elevation driver 26 that vertically moves the hand 22, an axial movement driver 27 that moves the hand 22 in the axial direction X of the chuck 1, and a lateral movement driver 28 that moves the hand 22 in the lateral direction Y when seen in the axial direction X. To be more specific, a machine tool body is provided with a lateral rail 29 that extends in the lateral direction Y (or a horizontal direction) when seen in the axial direction X. A first travel cart 30 can travel along the lateral rail 29. The lateral movement driver 28 may be incorporated in the first travel cart 30. In addition, an axial rail 31 that extends in the axial direction X can travel along the axial direction X with respect to the first travel cart 30. A second travel cart 32 is attached to the axial rail 31. The second travel cart 32, together with the axial rail 31, can travel along the axial direction X. The aforementioned axial movement driver 27 may be incorporated in the first travel cart 30. Further, a vertically extending elevation rod 33 can be vertically moved with respect to the second travel cart 32. The hand 22 is attached to the lower end of the elevation rod 33. The loader elevation driver 26 may be incorporated in the second travel cart 32. Thus, the hand 22 of the loader 2 is movable in the axial direction X, the lateral direction Y and the vertical direction, with respect to the chuck 1. Further, a loader rotation driver 34 that rotates the elevation rod 33 may be incorporated in the second travel cart 32. The loader rotation driver 34 may rotate the elevation rod 33 and the hand 22 about a vertically extending central axis of the elevation rod 33.

As shown in FIGS. 1 and 2, a measurement instrument 6 that measures a run-out of the master workpiece MP is attached to the hand 22 of the loader 2. The measurement instrument 6 includes a first sensor 6*a* (first measurement instrument) capable of measuring a vertical displacement, and a second sensor 6*b* (second measurement instrument) capable of measuring a horizontal displacement. The first sensor 6*a* and the second sensor 6*b* are attached to the hand 22 through an attachment member 5. The attachment member 5 is attached to, among the four side surfaces of the cuboid hand 22, a side surface opposite to the aforementioned hand claws 25. The first sensor 6*a* is attached to a lower surface of the cuboid attachment member 5, and is capable of coming into contact with the master workpiece MP or coming close to the master workpiece MP from above to measure a run-out of the master workpiece MP. The second sensor 6*b* is attached to a side surface (a side surface opposite to the hand claws 25) of the attachment member 5, and is capable of coming into contact with the master workpiece MP or coming close to the master workpiece MP in the horizontal direction to measure a run-out of the master workpiece MP. Examples of the first sensor 6*a* and the second sensor 6*b* may be a displacement sensor, a touch probe, etc., but are not limited thereto as long as they can measure a run-out of the master workpiece MP. In addition, the first sensor 6*a* and the second sensor 6*b* may be either a contact sensor that measures a run-out of the master workpiece MP while being in contact therewith, or a contactless sensor that measures a run-out of the master workpiece MP while separating therefrom. Herein, a run-out means a displacement of a measurement target surface (the cylindrical outer circumferential surface MPa or the distal end surface MPb) of the master workpiece MP, while the master workpiece MP is being rotated.

The controller 24 controls the aforementioned rotation driver 11, the loader driver 23, the measurement instrument 6 and the like. To be more specific, the controller 24 controls the rotation driver 11, the loader driver 23 and the measurement instrument 6 such that the hand 22 is first moved to a position at which the measurement instrument 6 can measure a run-out of the master workpiece MP, that the chuck 1 is then rotated, and that a run-out of the master workpiece MP is thereafter measured by the measurement instrument 6. When a run-out of the master workpiece MP is measured, the controller 24 may perform a first measuring step (see FIG. 2) in which a run-out of the cylindrical outer circumferential surface MPa of the master workpiece MP is measured by the first sensor 6*a*, and a second measuring step (see FIG. 5) in which a run-out of the distal end surface MPb of the master workpiece MP is measured by the second sensor 6*b*.

Figure 5:
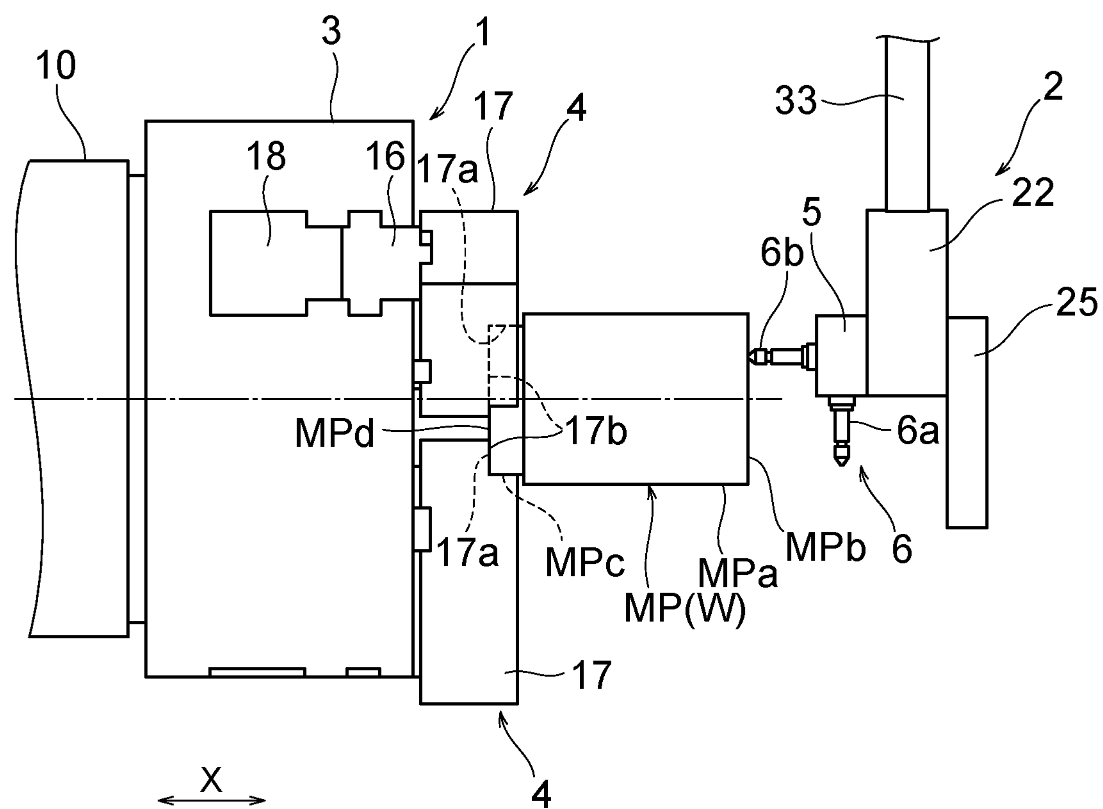
FIG. 5 is a view showing a state in which the chuck grip accuracy checking device of FIG. 2 is measuring a run-out of a distal end surface of a master workpiece gripped on the chuck.

For example, the controller 24 may control the loader driver 23 and the measurement instrument 6, such that the hand 22 is moved to a position at which the first sensor 6*a* can measure a run-out of the cylindrical outer circumferential surface MPa of the master workpiece MP so as to perform the first measuring step, and that the hand 22 is moved to a position at which the second sensor 6*b* can measure a run-out of the distal end surface MPb of the master workpiece MP so as to perform the second measuring step. In the first measuring step, run-outs of the cylindrical outer circumferential surface MPa of the master workpiece MP may be measured at a first measurement position and a second measurement position. The first measurement position is a position at which a run-out of the cylindrical outer circumferential surface MPa can be measured at a portion of the cylindrical outer circumferential surface MPa of the master workpiece MP, which is closer to the chuck body 3 (a proximal portion of the master workpiece MP). The second measurement position is a position at which a run-out of the cylindrical outer circumferential surface MPa can be measured at a portion of the cylindrical outer circumferential surface MPa of the master workpiece MP, which is opposite to the chuck body 3 (a distal portion of the master workpiece MP). In FIG. 2, the first measurement position is shown by two-dot chain lines, and the second measurement position is shown by solid lines. In the second measuring step, as shown in FIG. 5, a run-out of the master workpiece MP may be measured at a third measurement position. The third measurement position is a position at which a run-out of the distal end surface MPb (the end surface opposed to the chuck body 3) of the master workpiece MP can be measured. The third measurement position at which a run-out of the distal end surface MPb can be measured is preferably a position of the distal end surface MPb, which is closer to an outer circumference of the master workpiece MP.

The controller 24 records measured values of run-outs of the master workpiece MP measured by the first sensor 6*a* and the second sensor 6*b*. A measured value may be recorded in association with a rotation phase of the chuck 1. Measurements by the sensors 6*a* and 6*b* may be performed at predetermined phase intervals, for example.

The controller 24 determines whether a run-out of the master workpiece MP is proper or improper, based on a run-out value of the master workpiece MP measured by the measurement instrument 6. The determination of whether it is proper or improper may be made, for example, by determining whether or not the width of a run-out is larger than a predetermined reference value. A reference value may be set at each of the above three measurement positions, and whether it is proper or improper may be determined for each measurement position. Alternatively, in the determination of whether it is proper or improper, when a measured value of a run-out of the master workpiece MP, which is obtained at a given measurement position among the aforementioned three measurement positions, is improper, it may be determined to be improper.

When the controller 24 determines that the run-out is improper, the controller 24 may issue an alarm. For example, a machine tool display may indicate that it is improper. Alternatively, it may be notified by lighting or blinking a lamp, or the improper state may be notified by an alarm sound such as a buzzer. The improper state may be notified either during the measurement of a run-out of the master workpiece MP, or after the measurement.

Next, a method for checking grip accuracy of the chuck 1 according to this embodiment is described. Herein, an example in which the method for checking grip accuracy of the chuck 1 is performed, during a method for exchanging the claws 4 of the chuck 1.

First, the claws 4 are exchanged as a claw exchanging step. To be more specific, among three claws 4 attached to the chuck 1, a claw 4 to be exchanged is positioned, by rotating the chuck 1, at a position at which the claw 4 can be pulled upward from the attachment groove 3*a*. Following thereto, the finger 13 of the automatic claw exchanging device 12 is moved downward and is moved forward along the axial direction X of the chuck 1 to the hook groove 15*a* of the attachment block 15 of the claw 4, so that the key piece 13*a* of the finger 13 is latched onto the hook groove 15*a* of the attachment block 15. Then, the meshing member 20 of the claw releasably-engagement device 19 is moved backward so as to disengage the claw 4 from the master jaw 18. Thereafter, the finger 13 is moved upward to pull out the claw 4 from the attachment groove 3*a* of the chuck body 3. Then, the pulled-out claw 4 is conveyed to the stocker (not shown) so as to be stocked therein, and another claw 4 is latched onto the finger 13. Following thereto, the finger 13 is conveyed to a position above the attachment groove 3*a* and is moved downward so as to be inserted into the attachment groove 3*a* of the chuck body 3. Then, the meshing member 20 of the claw releasably-engagement device 19 is moved forward, so that the base jaw 16 of the claw 4 inserted in the attachment groove 3*a* is engaged with the master jaw 18. Then, the key piece 13*a* of the finger 13 is moved along the axial direction X of the chuck 1 so as to be moved backward from the hook groove 15*a* of the attachment block 15. After that, the finger 13 is moved upward to be retracted. By also performing such an operation on the other claws 4, the three claws 4 having been attached to the chuck 1 can be exchanged.

After the claw exchanging step, grip accuracy of the chuck 1 is checked, as a grip accuracy checking step.

First, as a griping step, a master workpiece MP is clamped on the claws 4. To be more specific, the hand 22 of the loader 2 clamps a desired master workpiece MP, which is stocked in the stocker (not shown), on the hand claws 25. Following thereto, the master workpiece MP is conveyed to a position at which the master workpiece MP can be clamped on the claws 4 of the chuck 1. At this time, the top jaw 17 of each claw 4 is positioned radially outside the position at which the master workpiece MP is clamped. When the master workpiece MP is conveyed, since the proximal end surface MPd is positioned toward the chuck 1, the hand claw 25 is positioned to have a posture so as to be closer to the chuck 1 than the attachment member 5. When the master workpiece MP arrives at a position at which it can be clamped on the claws 4 of the chuck 1, the proximal end surface MPd of the master workpiece MP comes into contact with a contact end surface 17*b* which is provided inside an inner circumferential contact surface 17*a* of the top jaw 17 and is perpendicular to the axial direction X. Next, the respective master jaws 18 move radially inside synchronously, and the respective top jaws 17 correspondingly move radially inside synchronously. Thus, the inner circumferential contact surfaces 17*a* of the top jaws 17 come into contact with the proximal end outer circumferential contact surface MPc of the master workpiece MP, so that the master workpiece MP is clamped on the claws 4. Thereafter, the hand 22 unclamps the master workpiece MP. In this manner, the master workpiece MP is clamped on the three claws 4.

After the gripping step, as a moving step, the hand 22 is moved to a position at which the measurement instrument 6 can measure a run-out of the master workpiece MP. To be more specific, by driving the loader elevation driver 26, the axial movement driver 27 and the lateral movement driver 28 of the loader driver 23, the first sensor 6*a* or the second sensor 6*b* of the measurement instrument 6 is moved to a desired position. In addition, the posture of the hand 22 may be changed by driving the loader rotation driver 34. Herein, as shown in FIG. 1, when seen from the distal end of the master workpiece MP to the proximal end thereof in the axial direction X, the orientation of the hand 22 is changed such that the attachment member 5 is positioned on the left side and the that the hand claws 25 are positioned on the right side. Moreover, the hand 22 may be moved to a position at which the first sensor 6*a* can measure a run-out of the master workpiece MP. Herein, the hand 22 is moved to the first measurement position (the position shown by the two-dot chain lines in FIG. 2) at which the first sensor 6*a* can measure a run-out of the master workpiece MP at the proximal portion of the master workpiece MP in the cylindrical outer circumferential surface MPa of the master workpiece MP.

After the moving step, as a measuring step, a run-out of the master workpiece MP is measured by the first sensor 6*a* of the measurement instrument 6. The measuring step may include a first measuring step in which a run-out of the cylindrical outer circumferential surface MPa of the master workpiece MP is measured by the first sensor 6*a*, and a second measuring step in which a run-out of the distal end surface MPb of the master workpiece MP is measured by the second sensor 6*b*.

For example, the first measuring step is performed first. At this time, a run-out of the cylindrical outer circumferential surface MPa of the master workpiece MP is measured on the proximal end side of the master workpiece MP by the first sensor 6*a* positioned at the first measuring position. During this step, the rotation driver 11 is driven to rotate the master workpiece MP together with the spindle 10 and the chuck 1. For example, the measurement of a run-out of the cylindrical outer circumferential surface MPa may be performed while the chuck 1 is being rotated from one of the three claws 4 through another claw 4 to reach the remaining claw 4. A rotation angle of the chuck 1 at this time is 240° in the case where three claws 4 are provided like this embodiment (in the case where two claws 4 are provided, the rotation angle is 180°). Alternatively, a run-out of the cylindrical outer circumferential surface MPa may be measured while the chuck 1 is being made one revolution (rotated at 360°). Any rotation angle is possible in the measuring step, as long as a run-out of the master workpiece MP can be effectively measured. Obtained measured values are recorded in the controller 24 in association with the rotation phases of the chuck 1.

Next, the hand 22 is moved to the second measurement position (the position shown by solid lines in FIG. 2) at which the first sensor 6*a* can measure a run-out of the cylindrical outer circumferential surface MPa at the distal portion of the master workpiece MP. Then, a run-out of the cylindrical outer circumferential surface MPa of the master workpiece MP is measured at the distal portion of the master workpiece MP by the first sensor 6*a* positioned at the second measurement position. During this step, similarly to the measurement at the aforementioned first measurement position, the rotation driver 11 is driven to rotate the master workpiece MP together with the spindle 10 and the chuck 1. Obtained measured values are recorded in the controller 24 in association with the rotation phases of the chuck 1.

Next, the hand 22 is moved to a position at which the second sensor 6*b* can measure a run-out of the master workpiece MP. Herein, the hand 22 is moved to the third measurement position (the position shown in FIG. 5) at which the second sensor 6*b* can measure a run-out of the master workpiece MP at the distal end surface MPb of the master workpiece MP. Then, the second measuring step is performed. At this time, a run-out of the distal end surface MPb of the master workpiece MP is measured by the second sensor 6*b* positioned at the third measurement position. During this step, similarly to the measurement at the aforementioned first measurement position, the rotation driver 11 is driven to rotate the master workpiece MP together with the spindle 10 and the chuck 1. Obtained measured values are recorded in the controller 24 in association with the rotation phases of the chuck 1.

In this manner, after the measurement instrument 6 has been moved to the measurement position of the master workpiece MP clamped on the chuck 1, the chuck 1 can be automatically rotated, and also a run-out of the master workpiece MP can be automatically measured. After the completion of the measurement, the hand 22 may be retracted to a position away from the master workpiece MP.

After the measuring step, as a determining step, it is determined whether a run-out of the master workpiece MP is proper or improper, based on the measured values of the run-out of the master workpiece MP. When it is determined to be improper, it is notified. In this case, an operator may correct the attachment of a claw 4, which is improperly attached, to the chuck body 3 (e.g., reattach the claw 4 thereto), and may check grip accuracy again.

When it is determined that a run-out of the master workpiece MP is proper, the master workpiece MP is detached from the claws 4. In this case, the hand 22 of the loader 2 first clamps the master workpiece MP. Following thereto, the respective master jaws 18 move radially outside synchronously, and the respective top jaws 17 correspondingly move radially outside synchronously. Thus, the inner circumferential surfaces 17*a* of the top jaws 17 are moved away from the proximal end outer circumferential contact surface MPc of the master workpiece MP, so that the master workpiece MP is unclamped from the claws 4. Thereafter, the master workpiece MP is conveyed to the stocker and is stored therein.

Next, the hand 22 clamps a desired workpiece W stocked in the stocker, and the workpiece W is conveyed to a position at which the workpiece W can be clamped on the claws 4 of the chuck 1. At this time, the top jaw 17 of each claw 4 is positioned radially outside the position at which the workpiece W is clamped. When the workpiece W reaches the position at which it can be clamped on the claws 4 of the chuck 1, the proximal end surface of the workpiece W comes into contact with the contact end surfaces 17*b* of the top jaws 17. Next, the respective master jaws 18 move radially inside synchronously, and the respective top jaws 17 correspondingly move radially inside synchronously. Thus, the inner circumferential contact surfaces 17*a* of the top jaws 17 come into contact with workpiece W, so that the workpiece W is clamped on the claws 4. Thereafter, the hand 22 unclamps the workpiece W. In this manner, the workpiece W is clamped on the three claws 4.

After that, the workpiece W clamped on the claws 4 is machined by a cutting tool of the tool post, not shown. As described above, after the exchange of the claws 4 and before the machining of the workpiece W, grip accuracy of the claws 4 is checked and the run-out of the master workpiece MP is determined to be proper. Thus, the workpiece W can be gripped on the claws 4, which have been checked for their grip accuracy and determined to be proper, to thereby ensure machining accuracy of the workpiece W.

Accordingly, since it is no more necessary for an operator to measure a run-out by himself/herself, problems such as misreading of a measured value by the operator and variation in measurement can be avoided. Since a run-out value measured by the measurement instrument 6 is associated by a rotation phase of the chuck 1, a rotation phase in which a run-out measured value is improper can be easily recognized. Namely, when a master workpiece MP is long, it has been difficult to simultaneously observe a run-out measured value and a rotation phase of the chuck 1, because a run-out measurement position is remote from the chuck 1. On the other hand, even when a master workpiece MP is long, this embodiment makes it possible to easily recognize a rotation phase of the chuck 1 in which a run-out measured value is improper. Thus, a claw 4 which is improperly attached can be easily determined, and an operation for correcting the attachment of the claw 4 can be efficiently performed. In addition, grip accuracy of the chuck 1 can be checked, after claws 4 mounted on the chuck body 3 have been exchanged and before a workpiece W is machined. Thus, if a defective workpiece W is found, it can be easily determined that the defect results from a cause (cutting tool, machine trouble, etc.) other than the exchanged claws 4.

Figure 6:
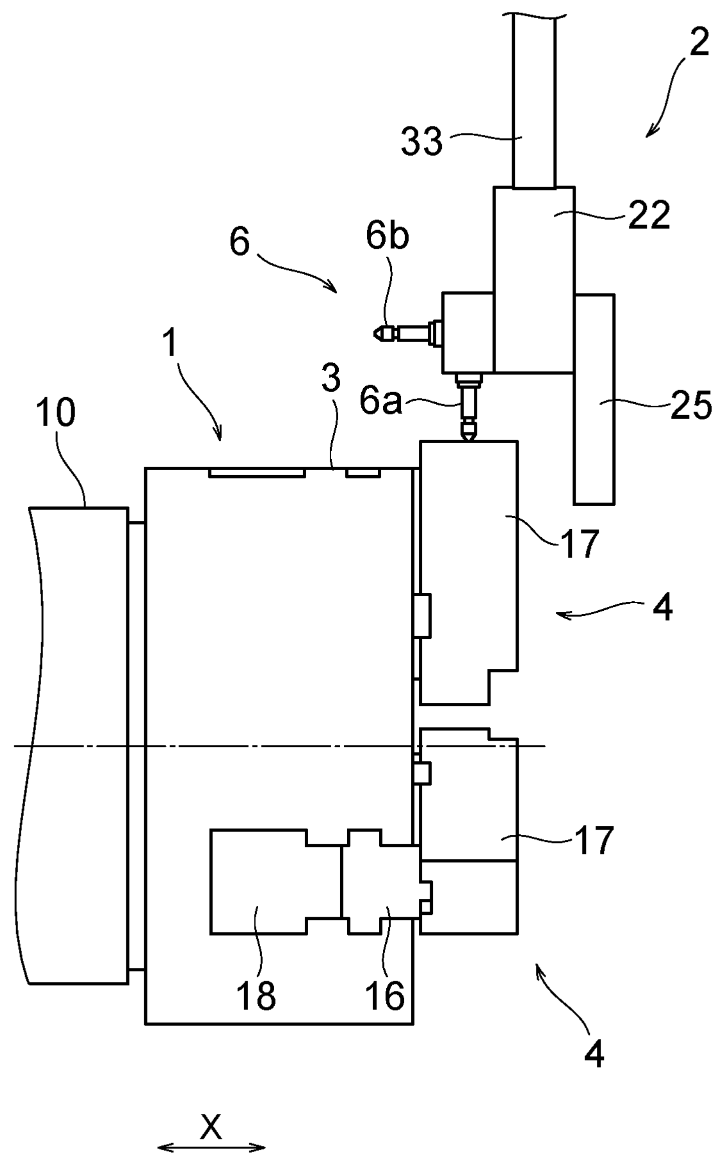
FIG. 6 is a view showing a state in which the chuck grip accuracy checking device of FIG. 2 is measuring a movement of a claw.

The device 21 for checking grip accuracy of the chuck 1 according to this embodiment can also be used for checking an operating state of the claws 4. Namely, a mechanism for radially moving the three claws 4 is composed of the master jaws 18 and so on, as described above. Grip accuracy checking device 21 according to this embodiment can be used also for checking whether this mechanism is proper or improper. In this case, as shown in FIG. 6, when the chuck 1 is opened by moving the claws 4 radially outside, an outer circumferential surface position of each claw 4 may be measured by the first sensor 6*a* or the second sensor 6*b* of the measurement instrument 6. When the outer circumference surface positions differ from claw to claw, it can be determined that this mechanism is improper. In addition, it can be determined whether the mechanism is proper or improper also by accumulating, as data, measured values of outer circumferential surface positions of one claw 4 and by analyzing the data. When the mechanism is determined to be improper, the mechanism can be corrected by an operator. Thus, the present invention can prevent trouble of the chuck 1 and can maintain it properly.

According to this embodiment, the hand 22 of the loader 2, to which the measurement instrument 6 is attached, is moved by driving the loader driver 23 to a position at which the measurement instrument 6 can measure a run-out of the master workpiece MP, and the measurement instrument 6 measures a run-out of the master workpiece MP at this position. Thus, a run-out of the master workpiece MP can be automatically measured, which eliminates the need for an operation by an operator. Thus, reliability in checking of grip accuracy of the chuck 1 after the exchange of the claws 4 can be improved.

In addition, according to this embodiment, the loader driver 23 includes the loader elevation driver 26 that vertically moves the hand 22, the axial movement driver 27 that moves the hand 22 in the axial direction X of the chuck 1, and the lateral movement driver 28 that moves the hand 22 in the lateral direction Y when seen in the axial direction X. Thus, the hand 22 to which the measurement instrument 6 is attached can be easily moved to a position at which the measurement instrument 6 can measure a run-out of the master workpiece MP. Thus, measurement accuracy of a run-out measured value of the measurement instrument 6 can be ensured, which can improve reliability in checking of grip accuracy of the chuck 1.

In addition, according to this embodiment, a run-out of the cylindrical outer circumferential surface MPa of the master workpiece MP is measured as the first measuring step, and a run-out of the distal end surface MPb of the master workpiece MP is measured as the second measuring step. Thus, run-outs of the master workpiece MP can be measured at different positions, which can improve reliability in checking of grip accuracy of the chuck 1.

In addition, according to this embodiment, the measurement instrument 6 includes the first sensor 6*a* capable of measuring a vertical displacement, and the second sensor 6*b* capable of measuring a horizontal displacement. Due to this, a run-out of the cylindrical outer circumferential surface MPa of the master workpiece MP can be measured by the first sensor 6*a*, and a run-out of the distal end surface MPb of the master workpiece MP can be measured by the second sensor 6*b*. Thus, when the first measuring step is shifted to the second measuring step, a movement distance of the hand 22 can be reduced, so that a time required for measuring a run-out of the master workpiece MP can be shortened.

In addition, according to this embodiment, the first measuring step is performed by moving the hand 22 by driving the loader driver 23 to a position at which a position at which the first sensor 6*a* can measure a run-out of the master workpiece MP. Then, the second measuring step is performed by moving the hand 22 by driving the loader driver 23 to a position at which the second sensor 6*b* can measure a run-out of the distal end surface MPb of the master workpiece MP. Thus, run-outs of the master workpiece MP can be automatically measured at different positions, which eliminates the need for an operation by an operator. Thus, reliability in checking of grip accuracy of the chuck 1 after the exchange of the claws 4 can be improved.

In addition, according to this embodiment, the master workpiece MP is clamped on the hand 22 and is conveyed to the chuck 1. Thus, a step of gripping the master workpiece MP on the claws 4 can be automatically performed. Thus, grip accuracy of the chuck 1 after the exchange of the claws 4 can be easily checked, and an operation by an operator is no more needed.

In the aforementioned embodiment, a master workpiece MP is given as an example of a measurement target, and an example in which a run-out of the master workpiece MP clamped on the claws 4 is measured for checking grip accuracy of the chuck 1 is described. However, not limited thereto, a run-out of a workpiece W clamped on the claws 4 may be measured for checking grip accuracy of the chuck 1. In this case, grip accuracy of the chuck 1 may be checked before a workpiece W is machined, or grip accuracy of the chuck 1 may be checked after a workpiece W has been machined.

In addition, in the aforementioned embodiment, an example in which the measurement instrument 6 that measures a run-out of the master workpiece MP incudes the first sensor 6*a* capable of measuring a vertical displacement, and the second sensor 6*b* capable of measuring a horizontal displacement is described. However, the structure of the measurement instrument 6 is not limited thereto. The number of sensors may be one or three or more. For example, the second sensor 6*b* may be positioned at a position which is lateral to the master workpiece MP and corresponds to the first measurement position and/or a position which is lateral to the master workpiece MP and corresponds to the second measurement position, and a run-out of the cylindrical outer circumferential surface MPa of the master workpiece MP may be measured.

In addition, in the aforementioned embodiment, an example in which run-outs of the cylindrical outer circumferential surface MPa of the master workpiece MP are measured respectively at the first measurement position (the proximal portion of the master workpiece MP) and the second measurement position (the distal portion of the master workpiece MP), and a run-out of the distal end surface MPb of the master workpiece MP is measured at the third measurement position is described. However, the present invention is not limited thereto. As long as reliability in checking of grip accuracy of the chuck 1 is ensured, a run-out of the master workpiece MP may be measured at any one of these three measurement positions to determine grip accuracy of the chuck 1.

In addition, in the aforementioned embodiment, an example in which the checking of grip accuracy of the chuck 1 is performed when the method for exchanging the claws 4 of the chuck 1 is performed is described. However, the present invention is not limited thereto. Grip accuracy of the chuck 1 may be checked, when the claws 4 are not exchanged, but when the claw 4 is supposed to be worn out because of long-term use.

In addition, in the aforementioned embodiment, an example in which the measurement instrument 6 is provided, through the attachment member 5, on the hand 22 of the loader 2 which conveys a workpiece W to be machined or a master workpiece MP is described. However, the present invention is not limited thereto. For example, when the machine tool has a robot capable of moving with respect to the chuck 1, the measurement instrument 6 may be attached to the robot. For example, when the automatic claw exchanging device 12 is attached to a distal end of the robot, the measurement instrument 6 may be attached to the automatic claw exchanging device 12. In addition, the measurement instrument 6 may be attached to, instead of the hand 22 of the loader 2, a tool post (also referred to as turret) used for machining a workpiece W, or a mill shaft for rotating a cutting tool.

In addition, in the aforementioned embodiment, an example in which the chuck 1 has three claws 4. However, the present invention is not limited thereto. The number of claws 4 may be two or four or more.

In addition, in the aforementioned embodiment, an example in which the chuck 1 is a chuck of a machine tool is described. However, the present invention is not limited thereto. This embodiment may be applied to a chuck used in an inspection device. Also in this case, by checking grip accuracy of the chuck 1 according to this embodiment, inspection accuracy of workpieces W by the inspection device can be ensured.

The present invention is not limited to the aforementioned embodiment, and can be carried out by suitably modifying a part of the structure within a range that does not depart from the scope of the present invention.

The invention claimed is:

1. A chuck grip accuracy checking method for checking grip accuracy by gripping a measurement target on claws of a chuck, the chuck grip accuracy checking method comprising:

conveying the measurement target, which is gripped on hand claws of a movable member, to the chuck so that the measurement target is gripped on the claws of the chuck, the movable member being provided with a measurement instrument capable of measuring a run-out of the measurement target;

moving the movable member by driving a movable-member driver to a position at which the measurement instrument can measure a run-out of the measurement target; and measuring a run-out of the measurement target by the measurement instrument, while the chuck is being rotated by driving a rotation driver.

2. The chuck grip accuracy checking method according to claim 1, wherein the movable-member driver includes an elevation driver that vertically moves the movable member, an axial movement driver that moves the movable member in an axial direction of the chuck, and a lateral movement driver that moves the movable member in a lateral direction when seen in the axial direction.

3. The chuck grip accuracy checking method according to claim 1, wherein the measuring includes a first measuring step in which a run-out of a cylindrical outer circumferential surface of the measurement target is measured, and a second measuring step in which a run-out of a distal end surface of the measurement target is measured.

4. The chuck grip accuracy checking method according to claim 3, wherein the measurement instrument includes a first measurement instrument capable of measuring a vertical displacement, and a second measurement instrument capable of measuring a horizontal displacement.

5. The chuck grip accuracy checking method according to claim 4, wherein:

in the measuring of the run-out, the movable member is moved by driving the movable-member driver to a position at which the first measurement instrument can measure a run-out of the measurement target;

in the first measuring step, a run-out of the cylindrical outer circumferential surface of the measurement target is measured by the first measurement instrument;

after the first measuring step, the movable member is moved by driving the movable-member driver to a position at which the second measurement instrument can measure a run-out of the measurement target; and in the second measuring step, a run-out of the distal end surface of the measurement target is measured by the second measurement instrument.

6. A chuck claw exchanging method comprising:

exchanging claws of a chuck; and checking a grip accuracy of the chuck after the claws are exchanged by:

conveying a measurement target, which is gripped on hand claws of a movable member, to the chuck so that the measurement target is gripped on the claws of the chuck, the movable member being provided with a measurement instrument capable of measuring a run-out of the measurement target;

moving the movable member by driving a movable-member driver to a position at which the measurement instrument can measure a run-out of the measurement target; and measuring a run-out of the measurement target by the measurement instrument, while the chuck is being rotated by driving a rotation driver.

7. A chuck grip accuracy checking device for checking grip accuracy by gripping a measurement target on claws of a chuck, the chuck grip accuracy checking device comprising:

a rotation driver configured to rotate the chuck;

a movable member that is movable with respect to the chuck and includes hand claws that are configured to grip the measurement target, the movable member being configured to convey the measurement target gripped on the hand claws to the chuck;

a movable-member driver that is configured to move the movable member with respect to the measurement target;

a measurement instrument that is provided on the movable member, and is configured to measure a run-out of the measurement target; and a controller configured to control the rotation driver, the movable-member driver and the measurement instrument such that, after the movable member has been moved to a position at which the measurement instrument can measure a run-out of the measurement target, a run-out of the measurement target is measured by the measurement instrument, while the chuck is being rotated.

8. The chuck grip accuracy checking device according to claim 7, wherein the movable-member driver includes an elevation driver that is configured to vertically move the movable member, an axial movement driver that is configured to move the movable member in an axial direction of the chuck, and a lateral movement driver that is configured to move the movable member in a lateral direction when seen in the axial direction.

9. The chuck grip accuracy checking device according to claim 7, wherein the measurement instrument includes a first measurement instrument capable of measuring a vertical displacement, and a second measurement instrument capable of measuring a horizontal displacement.

10. The chuck grip accuracy checking device according to claim 9, wherein the controller is configured to control the movable-member driver and the measurement instrument such that:

the movable member is moved to a position at which the first measurement instrument can measure a run-out of a cylindrical outer circumferential surface of the measurement target;

a run-out of the cylindrical outer circumferential surface of the measurement target is measured by the first measurement instrument;

the movable member is moved to a position at which the second measurement instrument can measure a run-out of a distal end surface of the measurement target; and a run-out of the distal end surface of the measurement target is measured by the second measurement instrument.

* * * * *